United States Patent [19]

Hill

[11] 4,302,867

[45] Dec. 1, 1981

[54] DUAL FEED CONVEYOR IN GIZZARD PROCESSING MACHINE

[76] Inventor: Carl J. Hill, Rte. 3, Box 229, Ball Ground, Ga. 30107

[21] Appl. No.: 128,807

[22] Filed: Mar. 10, 1980

[51] Int. Cl.³ .............................................. A22C 21/00
[52] U.S. Cl. ......................................... 17/11; 17/58
[58] Field of Search .............................. 17/11, 58, 72

[56] References Cited

U.S. PATENT DOCUMENTS 1,450,508  4/1923  MacPhee ................................ 17/58
4,073,040  2/1978  Hill ..................................... 17/11 X Primary Examiner—Willie G. Abercrombie
Attorney, Agent, or Firm—Darbo & Vandenburgh

[57] ABSTRACT

At the infeed end of a poultry gizzard processing machine are two roller chains comprising a smaller chain riding piggyback on a larger chain. The larger chain has links which extend past either side of the smaller chain and up to define a platform for supporting the gizzard above the smaller chain. The stomach does not rest on this platform but descends between those links to ride on the smaller chain. The smaller chain moves faster than the larger chain to exert a pulling force on the stomach with respect to the gizzard.

7 Claims, 6 Drawing Figures

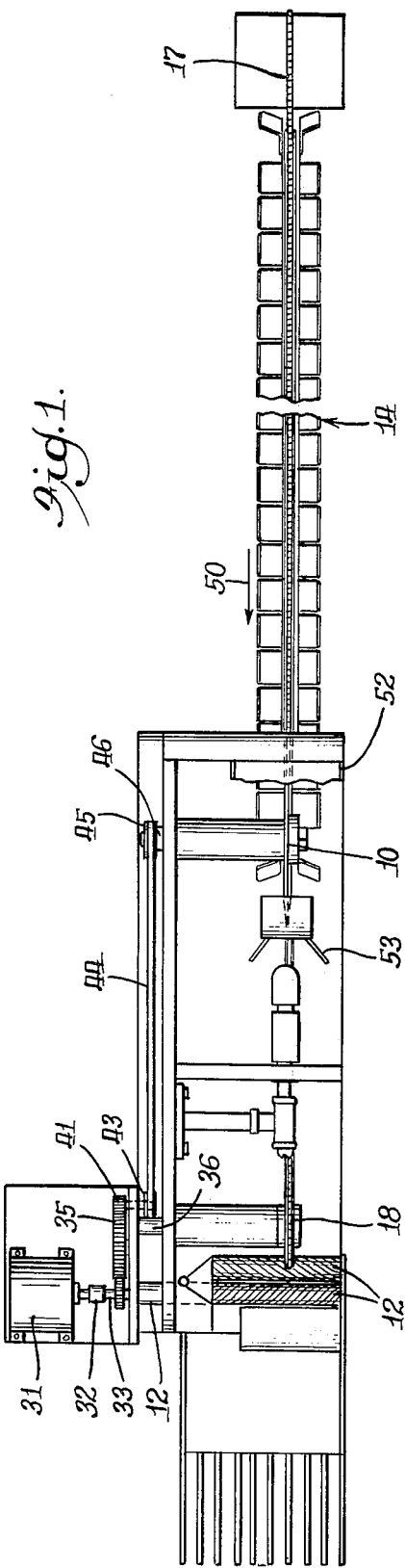
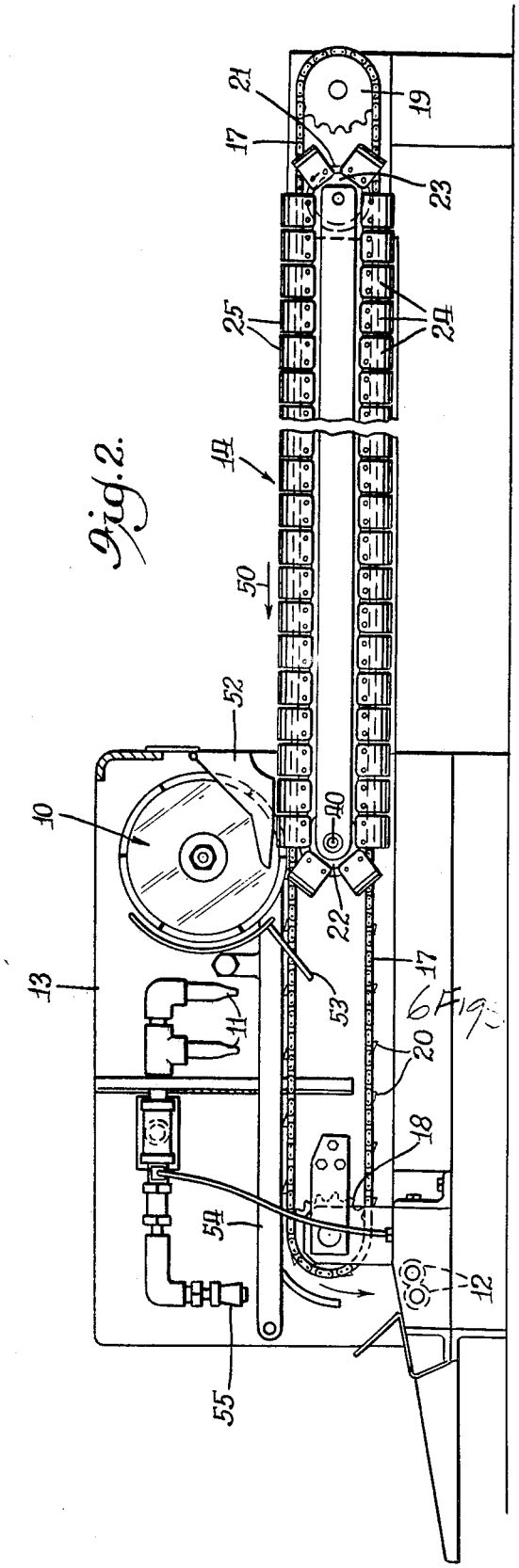

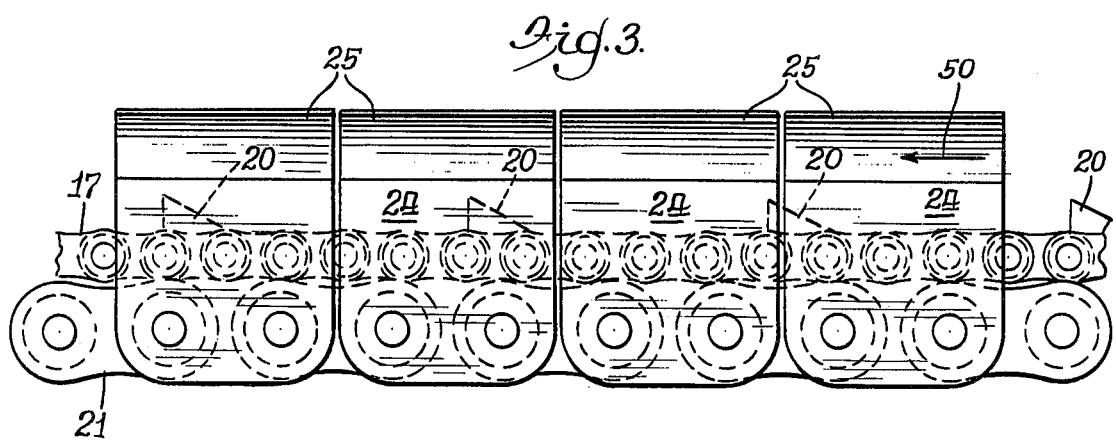
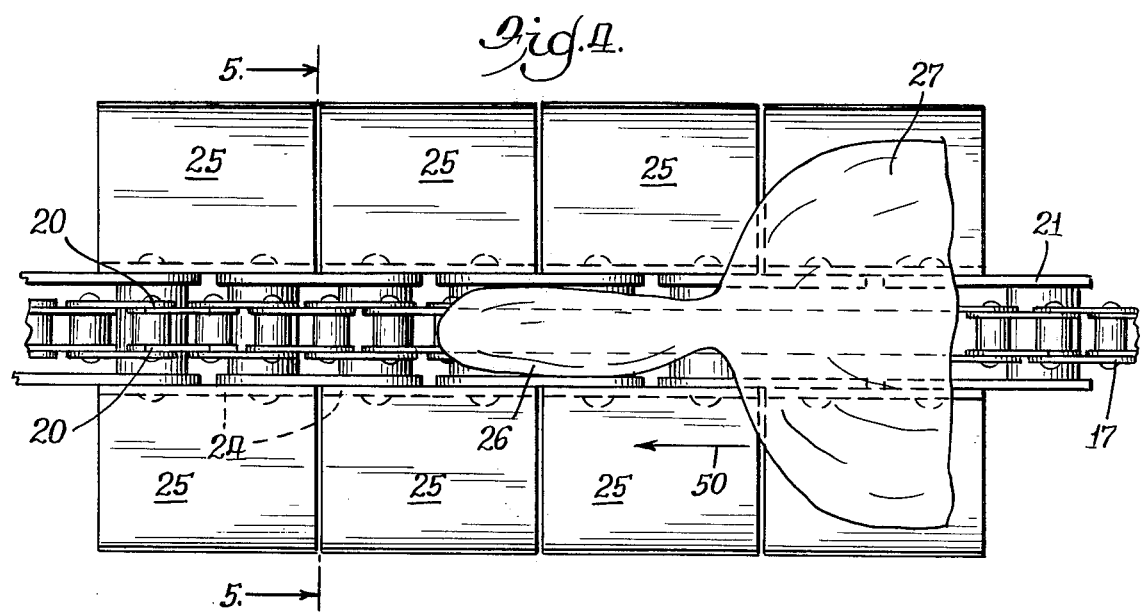
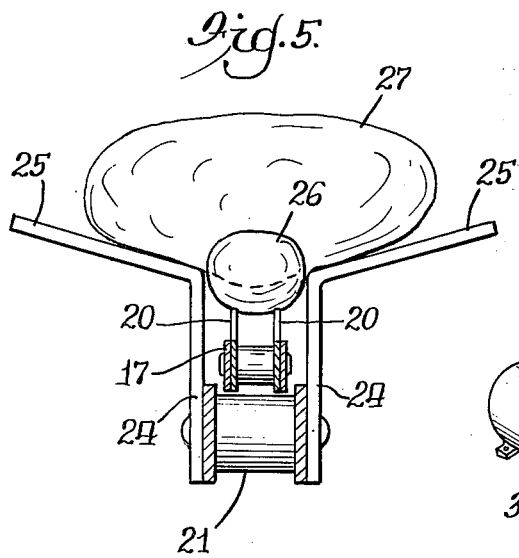
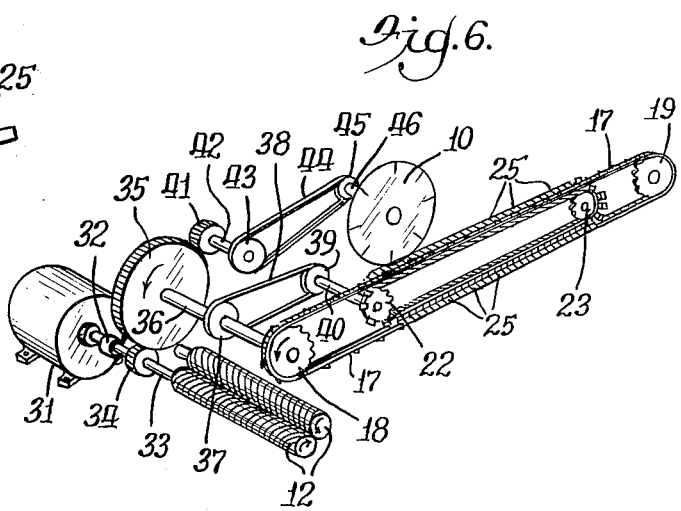

DUAL FEED CONVEYOR IN GIZZARD PROCESSING MACHINE

BACKGROUND AND SUMMARY OF THE INVENTION

The present invention relates to a feed conveyor apparatus used with a gizzard cutting and washing machine of the type wherein the gizzards are preceded into the machine by their respective stomachs, the latter being employed to align the gizzards in the machine for cutting in a predetermined orientation.

It is known to be advantageous in gizzard processing machines to use the stomach as a means for orienting the gizzard for appropriate cutting. Machines utilizing this concept employ a feed apparatus designed to cause the gizzard to be preceded into the machine by the respective stomach. This is done in a trough forming a chute with a stream of water flowing down the trough. See, for example, FIG. 11 of my prior U.S. Pat. No. 3,172,148, issued March 9, 1965, and entitled Poultry Gizzard Processing Apparatus. While such feed apparatus performs quite satisfactorily, it suffers from the disadvantage of consuming significant quantities of water. The principal object of the present invention is to overcome this disadvantage and provide a feed apparatus which functions with equal satisfaction, if not better, to supply the gizzards in proper orientation to the cutting knife to be severed without the continuing cost for water. In other respects, and particularly so far as the machine operator is concerned, the present feed apparatus resembles the known devices and thus does not require any retraining of personnel so far as the loading of the machine is concerned.

The present invention employs two moving belts with a smaller belt riding piggyback on a larger belt. The stomach rides on the smaller belt, while the gizzard is supported from the larger belt and above the smaller belt by inverted "L" shaped members which are attached to the larger belt and define a platform for the gizzard at an elevation above that of the smaller belt. The smaller belt is moved at a greater speed than is the larger belt thereby exerting a pulling force on the stomach to draw the respective gizzard into the desired alignment for cutting.

Further objects and advantages will be apparent from the following description and drawings.

DESCRIPTION OF THE DRAWINGS

FIG. 1 is a plan view of a gizzard processing machine embodying the present invention;

FIG. 2 is an elevational view, partially in section, of the machine of FIG. 1;

FIG. 3 is an enlarged partial view of the feed apparatus as viewed in FIG. 2;

FIG. 4 is a plan view of the feed apparatus as seen in FIG. 3 and illustrates a portion of a gizzard with the respective stomach;

FIG. 5 is a section as seen at line 5—5 of FIG. 4; and

FIG. 6 is a diagrammatic view of the power drive for the machine of FIGS. 1 and 2.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The illustrated processing machine includes a cutting station at which there is a rotary cutting knife, generally 10, a washing station at which there are a plurality of water discharge nozzles 11, and a lining removal station at which there are a pair of interengaging helical peeling rolls 12. These are all mounted on a frame 13. Part of the feed conveyor, generally 14, of the present invention serves the double duty of transporting the cut gizzards through the various processing stations as will hereinafter be apparent.

This feed conveyor comprises a roller chain belt 17 which is trained for movement about a pair of sprocket wheels 18 and 19. These wheels are rotatably mounted from frame 13. A number of the links of this chain carry projecting points 20. There is a second roller chain belt 21 which is trained for movement by a pair of sprocket wheels 22 and 23. A number of the links of this roller chain include inverted "L" shaped supports formed by an upright portion 24 and a support or platform portion 25. As is best seen in FIGS. 4 and 5, the chain employed for belt 17 is considerably smaller than the chain employed for the belt 21. Thus, for example, chain 21 can be of a nominal No. 60 size and chain 17 can be of a nominal No. 41 size. The spacing between the links of which uprights 24 are a part thus will be sufficient to permit the stomach 26 to descend therebetween so that it rides upon belt 17 and will be engaged by the points 20 projecting therefrom. However, this space is too small to receive the respective gizzard 27 so that it rests upon the upper faces of support portions 25, which faces from supporting surfaces. The support portions on each side slant slightly down toward the opposite side as an aid toward keeping the gizzard from falling off and as a means for centering the gizzard between them.

A single motor 31 drives all of the moving parts of the machine. As best seen in FIG. 6, the motor shaft is connected by a flexible coupling 32 to the drive shaft 33 for the peeler rolls. This shaft carries a pinion 34 which in turn drives a gear 35. Gear 35 is secured to a shaft 36 which also carries sprocket wheel 18. A V-belt pulley 37 on this shaft drives a pulley 39 by means of belt 38. Both pulley 39 and sprocket wheel 22 are secured to a shaft 40. Knife 10 is driven from gear 35 by means of pinion 41, shaft 42, pulley 43, V-belt 44, pulley 45 and shaft 46.

Chain belt 17 is driven somewhat faster than is chain belt 21. A speed differential of about 10 to 15 percent has proven to be eminently satisfactory. Thus chain belt 21 may move at a speed of about thirty feet per minute, while chain belt 17 moves at a speed of about thirty four feet per minute. Where with the past machines the operator who was removing the gizzard, with the respective stomach attached, from a poultry carcass would deposit the two on the feed chute with the gizzard preceded by the stomach, that operator would now similarly deposit the two on the feed conveyor 14. The two need not be accurately aligned, although it is necessary, as it was with past practices, that the gizzard be preceded by the respective stomach. Even though the two are not accurately aligned on the feed conveyor, that will be corrected since the stomach will be at least temporarily engaged by prongs 20 and pulled forward, in the direction indicated by arrow 50. This pulling will correct the inaccuracies in the alignment.

As the two enter the machine they pass beneath the pivotally supported entrance gate 52, as in past practices. The gizzard is then cut by the knife 10 and a plow 53 spreads the cut gizzard out on the top run of chain belt 17, with the interior of the gizzard being exposed upwardly and about centered below holddown bar 54. At the washing station the interior of the gizzard is flushed by water from nozzles 11. As the chain belt 17 moves about a sprocket wheel 18 the gizzard is deposited upon the peeler rolls 12. At this location there again is a water flushing provided by the water from nozzle 55.

I claim:

1. In a machine for processing poultry gizzards with the stomachs attached which comprises endless conveyor means having a run thereof trained for movement along a given path in a given direction, and adapted to support and transport the gizzard, cutting means positioned at a first location for cutting the gizzard open to thereby expose the interior of the gizzard, and washing means adjacent the path at a second location along the path for flushing the exposed interior of the gizzard, the improvement wherein said conveyor means comprises:

a first endless conveyor comprising a pair of first wheels and first endless belt means engaging said wheels and having a run thereof located substantially in said path and extending for the full length of said path; and a second endless conveyor comprising a second pair of wheels, second endless belt means engaging said second wheels and a plurality of gizzard support means secured to said belt, said second endless belt means having a run thereof located substantially in a portion of said path and below said run of the first belt means, one of the second wheels defining the upstream end of said run of the second belt means and the other of the second wheels defining the downstream end thereof, said second wheels being located intermediate the first wheels with said downstream end being sufficiently close to said first location such that a gizzard on said conveyor means will at least commence to be cut before reaching said downstream end, said support means comprising upright portions at each side of the second belt means and having proximal parts and distal parts, the proximal parts being affixed to the second belt means, at said run of the second belt means said upright portions being at each side respectively of the first belt means and spaced apart a distance sufficiently great to permit a stomach to be received therebetween to ride on the first belt means and with said distal parts at a greater elevation than said first belt means, said support means including supporting surfaces at said distal parts and, at said run of the second belt means, sufficiently close together to hold a gizzard riding thereon above the first belt means.

2. In a machine as set forth in claim 1, wherein said first belt means moves faster than the second belt means.

3. In a machine as set forth in claim 2, wherein each said support means is, in transverse cross section, approximately the shape of an inverted "L".

4. In a machine as set forth in claim 3, wherein said second belt means is a roller chain having a plurality of links, and said support means consists of a plurality of discrete segments each of which functions as a chain link.

5. In a machine as set forth in claim 4, wherein said first belt means is a roller chain, both roller chains being of a nominal size with the nominal size of the first belt means being smaller than the nominal size of the second belt means.

6. In a machine as set forth in claim 2, wherein said second belt means is a roller chain having a plurality of links, and said support means consists of a plurality of discrete segments each of which functions as a chain link.

7. In a machine as set forth in claim 6, wherein said first belt means is a roller chain, both roller chains being of a nominal size with the nominal size of the first belt means being smaller than the nominal size of the second belt means.

* * * * *